United States Patent
McQuaide, Jr. et al.

(10) Patent No.: US 7,215,942 B1
(45) Date of Patent: May 8, 2007

(54) ARCHITECTURE FOR MANAGING PREPAID WIRELESS COMMUNICATIONS SERVICES

(75) Inventors: Arnold Chester McQuaide, Jr., Berkeley Lake, GA (US); Robert A. Koch, Norcross, GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 704 days.

(21) Appl. No.: 09/925,862

(22) Filed: Aug. 9, 2001

(51) Int. Cl.
*H04M 11/00* (2006.01)
*H04M 15/00* (2006.01)

(52) U.S. Cl. .................. 455/408; 455/405; 379/114.17; 379/114.19; 379/114.2

(58) Field of Classification Search ............... 455/405, 455/406, 407, 408, 409; 379/114.01, 114.19, 379/114.2, 114.16, 114.17
See application file for complete search history.

(56) References Cited

U.S. PATENT DOCUMENTS

| | | | |
|---|---|---|---|
| 6,058,300 A * | 5/2000 | Hanson | 455/406 |
| 6,070,067 A * | 5/2000 | Nguyen et al. | 455/407 |
| 6,181,785 B1 * | 1/2001 | Adams et al. | 379/114.01 |
| 6,480,710 B1 * | 11/2002 | Laybourn et al. | 455/406 |
| 6,487,401 B2 * | 11/2002 | Suryanarayana et al. | 455/406 |
| 6,493,547 B1 * | 12/2002 | Raith | 455/405 |
| 6,741,687 B1 * | 5/2004 | Coppage | 379/114.2 |
| 2001/0028705 A1 * | 10/2001 | Adams et al. | 379/114.2 |
| 2002/0115424 A1 * | 8/2002 | Bagoren et al. | 455/408 |
| 2003/0002635 A1 * | 1/2003 | Koch et al. | 379/88.17 |
| 2003/0158960 A1 * | 8/2003 | Engberg | 709/237 |

* cited by examiner

*Primary Examiner*—Binh K. Tieu
(74) *Attorney, Agent, or Firm*—Withers & Keys LLC

(57) ABSTRACT

The present invention is directed to a system and method for managing a prepaid wireless account for voice and data communications services. According to one embodiment the communications system, having a prepaid architecture for managing a plurality of prepaid wireless accounts for communication services, wherein each prepaid account is associated with a prepaid subscriber comprises a wireless network including a mobile switch, in communication with a wireless device, the wireless device for remotely managing at least one of the prepaid accounts. The communications system also comprises a wide area network including a prepaid account database for storing records assigned to subscribers of prepaid communications services; a prepaid application module for initializing and updating the prepaid accounts; a credit card transaction server, coupled to a credit card database, for checking available credit; and a prepaid server coupled to the prepaid account database and the prepaid application module. The communications system also includes a gateway in communication with the mobile switch of the wireless network and in communication with the wide area network.

17 Claims, 5 Drawing Sheets

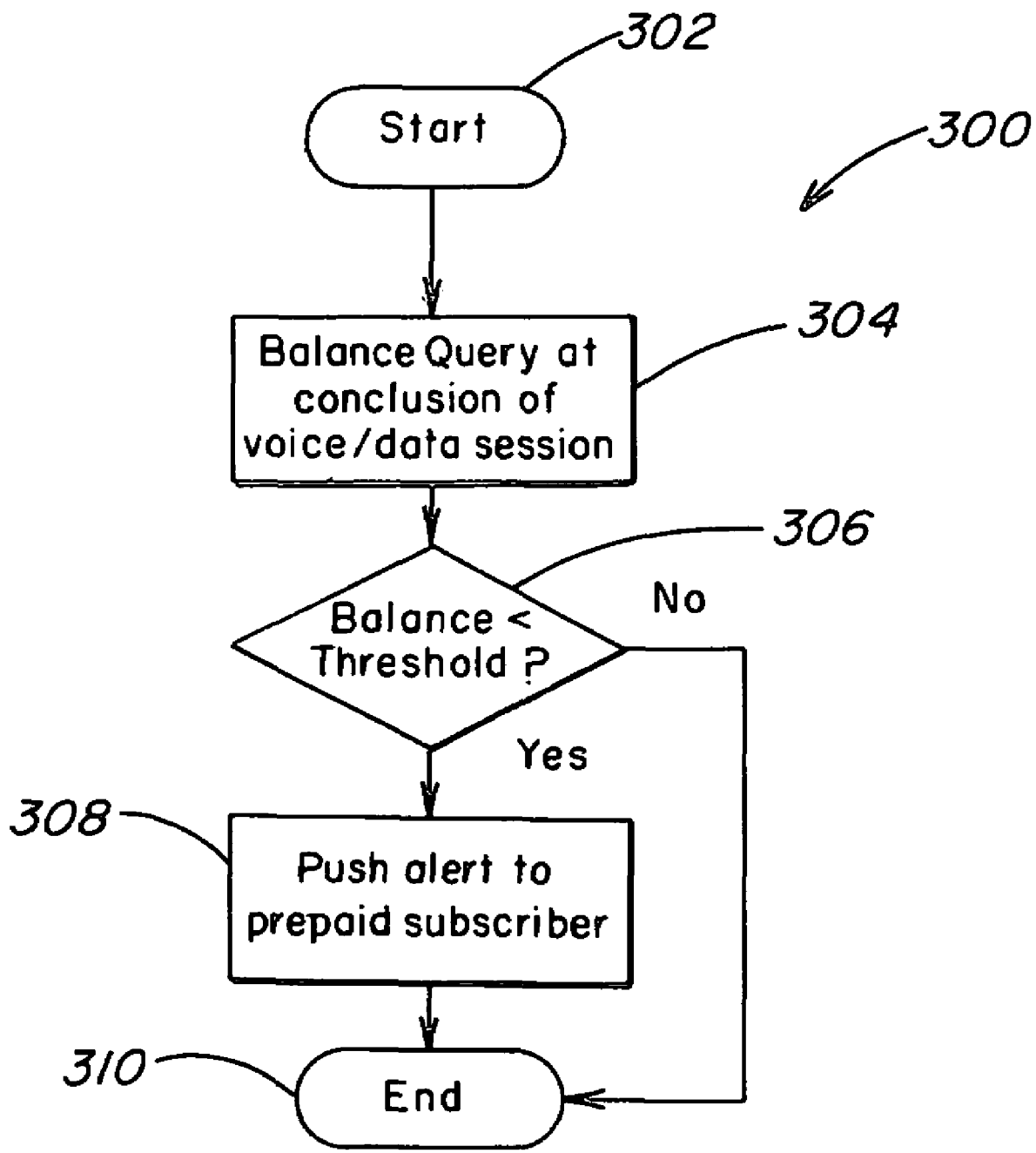

ARCHITECTURE FOR MANAGING PREPAID WIRELESS COMMUNICATIONS SERVICES

BACKGROUND OF THE INVENTION

1. Field of Invention

The present invention relates generally to communications services and, more particularly, to a system and method for managing a prepaid wireless account for voice and data communications services.

2. Description of the Background

Wireless carriers have recently introduced a prepayment architecture in which subscribers prepay for services. The prepayment architecture benefits both carriers and subscribers. For the carriers, the prepayment architecture allows them to obtain payment in advance, which eliminates the cost of collection services or the need to acquire security, such as a credit card, in advance of engaging a subscriber. For the subscriber, the prepayment architecture avoids the typical credit checks, long-term contracts and billing agreements associated with standard wireless offers. Moreover, the prepayment architecture gives subscribers the ability to "pay as they go" for their wireless usage.

Despite the popularity of prepaid wireless accounts, most subscribers find the process for replenishing the account balance too burdensome. For example, subscribers must purchase refill cards at wireless carrier stores or at participating retail locations. Consequently, subscribers must locate and visit one of these establishments during regular business hours to purchase additional minutes. Also, subscribers may recharge cards using interactive voice response systems. Such a scheme may be too cumbersome and time-consuming. The recent standardization of wireless application protocol, however, may help to ease this burden.

Wireless application protocol (WAP) is an open specification that offers a standard method to access Internet-based content and services from wireless devices such as mobile phones and PDAs (Personal Digital Assistants). WAP is a layered communication protocol that includes network layers (e.g., transport and session layers) as well as an application environment including a browser, scripting, telephony value-added services and content formats. This architecture allows WAP services to be hosted on standard world wide web (WWW) servers since they communicate with a WAP gateway/proxy using standard Internet protocols.

A prepayment architecture is needed that allows subscribers of prepaid wireless services to create and update account information in a simple and convenient manner. The architecture should provide sufficient flexibility so that subscribers can manage their account using either a personal computer or a wireless device. The system should also provide subscribers with secure access to perform a variety of the most popular account management functions such as account balance inquiries and account replenishment.

SUMMARY OF THE INVENTION

The present invention is directed to a system and method for managing a prepaid wireless account for voice and data communications services. According to one embodiment, the communications system, having a prepaid architecture for managing a plurality of prepaid wireless accounts for communication services, wherein each prepaid account is associated with a prepaid subscriber, comprises a wireless network including a mobile switch, in communication with a wireless device, the wireless device for remotely managing at least one of the prepaid accounts. The communications system also comprises a wide area network including a prepaid account database for storing records assigned to subscribers of prepaid communications services; a prepaid application module for initializing and updating the prepaid accounts; a credit card transaction server, coupled to a credit card database, for checking available credit; and a prepaid server coupled to the prepaid account database and the prepaid application module. The communications system also includes a gateway in communication with the mobile switch of the wireless network and in communication with the wide area network.

The system and method of the present invention may be used to manage a prepaid wireless account for communications services. The present invention provides a system for prepaid wireless subscribers to remotely manage their accounts. These and other benefits of the present invention will be apparent from the detailed description below.

DESCRIPTION OF THE FIGURES

For the present invention to be understood clearly and readily practiced, the present invention will be described in conjunction with the following figures, wherein:

FIG. 5 is an exemplary flow diagram that illustrates a process for alerting prepaid subscribers when the recharge threshold is encountered at the conclusion of a voice/data session.

DETAILED DESCRIPTION OF THE INVENTION

Figure 1:
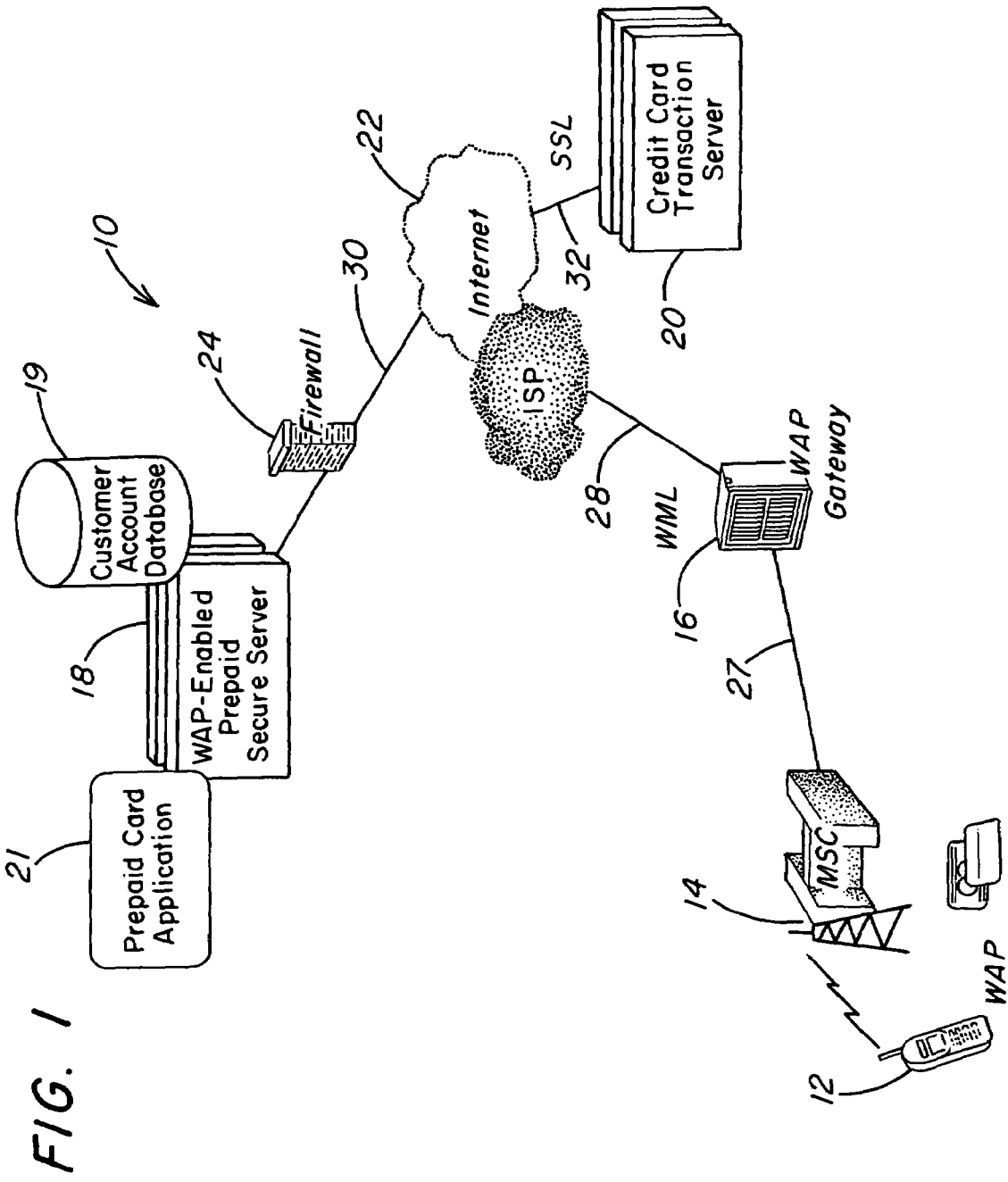
FIG. 1 is a simplified schematic diagram of a system for managing a prepaid wireless account for voice and data communications services, according to one embodiment of the present invention.

It is to be understood that the figures and descriptions of the present invention have been simplified to illustrate elements that are relevant for a clear understanding of the present invention while eliminating, for purposes of clarity, other elements. For example, certain details of a wireless network and certain account management platforms are not described herein. Those of ordinary skill in the art will recognize, however, that these and other elements may be desirable in a typical wireless network. A discussion of such elements is not provided because such elements are well known in the art and because they do not facilitate a better understanding of the present invention.

The various features of the invention will now be described with respect to the figures, in which like parts are identified with the same reference characters. The following description utilizes the wireless application protocol (WAP) and wireless markup language (WML) standards as a basis for linking a wireless device to a remote application. It will be recognized, however, that these standards are used by way of example only, and that the concepts utilized here are equally applicable in other environments that do not operate in accordance with these particular standards.

FIG. 1 is a simplified schematic diagram of a system 10, according to one embodiment of the present invention, for managing subscriber accounts for prepaid wireless services. The system 10 includes a WAP-enabled wireless device 12, a mobile switching center (MSC) 14, a WAP gateway 16, a prepaid secure server 18, a customer account database 19, a credit card transaction server 20, a prepaid card application module 21, an Internet 22, and a firewall 24. The wireless device 12 may be any wireless digital processor capable of accessing the Internet such as, for example, a WAP-enabled mobile telephone, a personal digital assistant, or a pager.

Mobile switching center 14 may comprise any one of a number of known communications switching devices, including those commonly used and known in the art for providing either digital or analog cellular telephone service to a plurality of wireless devices 12. The mobile switching center 14 performs switching functions to permit communication between the Internet 22 and the wireless device 12. Although only one mobile switching center 14 is shown, it will be understood that system 10 likely includes many more.

The WAP gateway 16 refers to a software infrastructure that connects the wireless domain (i.e. wireless device 12 and MSC 14) with the Internet 22. Specifically, the WAP gateway 16 carries out protocol conversions between WAP communication protocols and the Internet communication protocols (e.g. HTTP, TCP/IP). The WAP gateway 16 also performs content encoding, such as encoding of WML into binary format and compilation of WMLScripts. The WAP gateway 16 typically resides within the wireless carrier's network but may also reside within a corporate business environment.

The prepaid secure server 18 can be a single physical machine or multiple machines linked together. The firewall 24 is a system, usually a combination of hardware and software, interposed between prepaid server 18 and the rest of the Internet 22 that enforces a security policy on communication traffic entering and leaving an internal network. As shown in FIG. 1, communications to and from the prepaid server 18 go through the firewall 24.

The customer account database 19 stores information related to the prepaid service credit balance of the prepaid subscriber. The customer account database identifies particular subscribers, credit card information, and other account specific information concerning that subscriber.

The credit card transaction server 20 includes one or more of the commercial credit card databases such as, for example, MasterCard or Visa. Each record of this database corresponds to one transaction using a given credit card. Each record may include, for example, an account number, an expiration date of the card, a transaction amount, a merchant identification number, and a credit limit. The credit card server 20 communicates with prepaid secure server 18 to update the subscriber credit information stored in the customer account database 19.

The application module 21 carries out administrative transactions in connection with certain prepaid communications services including account initialization, balance queries, and account recharging. Module 21 may be implemented using hardware or software. Those skilled in the art will appreciate that the process described below may be implemented at any level, ranging from hardware to application software and in any appropriate physical location. For example, module 21 may be implemented as software code to be executed by the prepaid server 18 using any suitable computer language such as, for example, microcode, and may be stored in, for example, an electrically erasable programmable read only memory (EEPROM), or can be configured into the logic of the prepaid server 18. According to another embodiment, module 21 may be implemented as software code to be executed by the prepaid server 18 using any suitable computer language such as, for example, Java, Perl, C or C++ using, for example, conventional or object-oriented techniques. The software code may be stored as a series of instructions or commands on a computer readable medium, such as random access memory (RAM), read only memory (ROM), a magnetic medium such as a hard-drive or a floppy disk, or an optical medium such as CD-ROM. The application module 21 may also be a computer, such as a workstation or a personal computer, a microprocessor, a network server, or an application specific integrated circuit, using any suitable type of computer instruction.

The mobile switching center 14 is coupled to the gateway 16 by communication link 27, which may be, for example, a T1 connection. The gateway 16 is then coupled to the Internet 22 by communication link 28, which may be, for example, a T1 connection or a T3 connection. Likewise communication links 30 and 32 couple the prepaid server and credit card transaction server 20 to the Internet 22 using, for example, a T1 or T3 connection. Those skilled in the art will appreciate that the hardware and software interfaces between the elements shown in FIG. 1 are conventional and do not form part of the invention.

Figure 2:
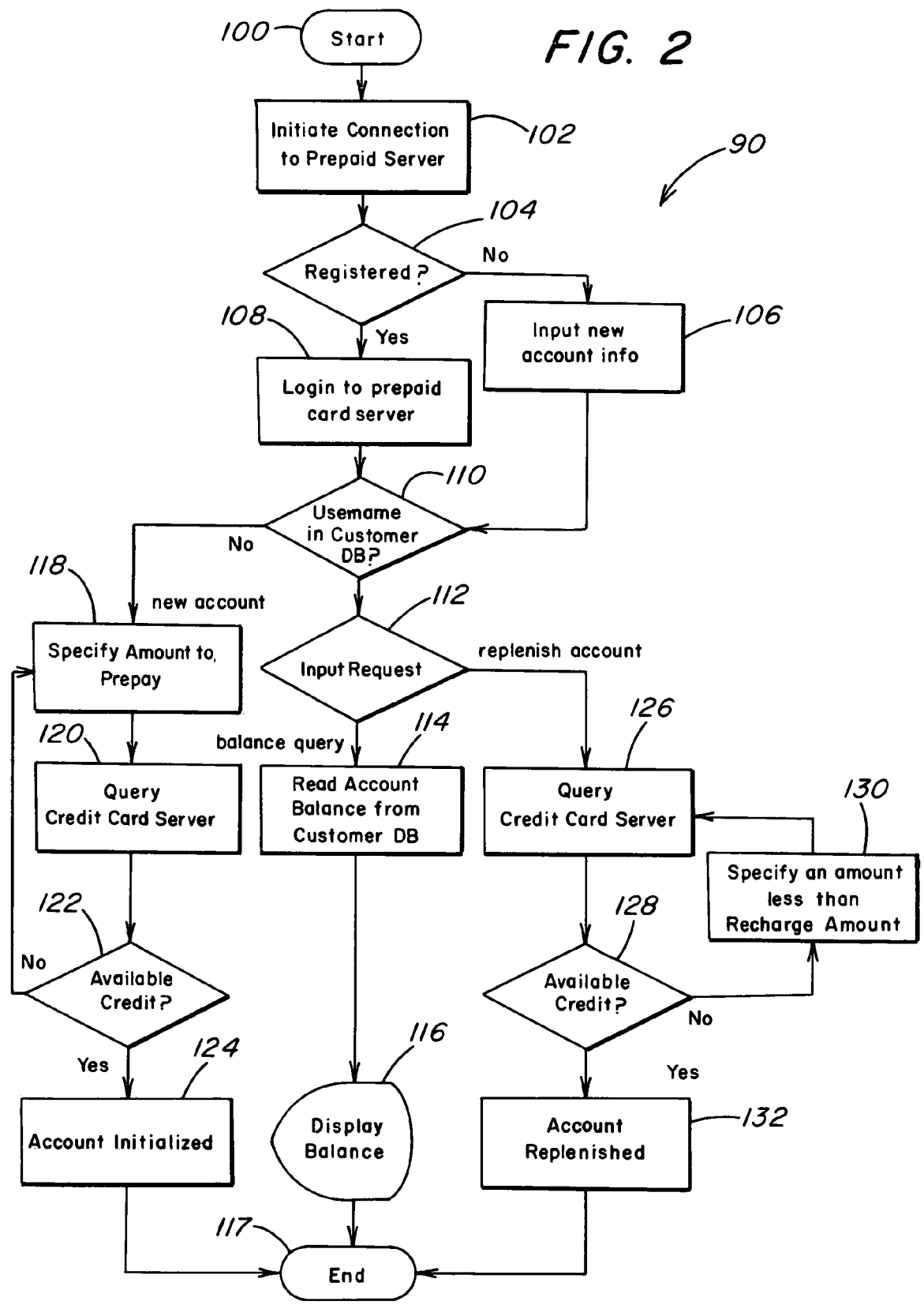
FIG. 2 is an exemplary flow diagram that illustrates a process for managing subscriber accounts for prepaid wireless services according to one embodiment of the present invention.

FIG. 2 is a simplified flow diagram that illustrates a process 90 for managing subscriber accounts for prepaid wireless services according to one embodiment of the present invention. FIG. 2 is entered at step 100, and in step 102, the prepaid subscriber uses wireless device 12 to initiate a connection with the prepaid server 18, such as by entering a uniform resource locater (URL) in a conventional manner. The request is sent from the wireless device 12 to the WAP gateway 16 using wireless session protocols, essentially a binary version of HTTP. The present invention establishes a secure connection between the wireless device 12 and gateway 16 using transport layer security, such as wireless transport layer security (WTLS). WTLS is based on transport layer security, but optimized for narrowband communication channels. The communication then works its way through the system 90 in a manner well know to those skilled in the art until it reaches the prepaid server 18. The prepaid wireless server 18 then interfaces with the application module 21 to manage the subscriber's request for account access. Those of ordinary skill in the art will appreciated that the application module 21 may reside on the prepaid server 18 or may reside on any web server connected either directly to the prepaid server 18 or the Internet 22.

For return communication issued to the wireless device 12, content is suitably formatted in, for example, wireless markup language (WML) to accommodate the small screen and low bandwidth/high latency connection. The WML for WAP is analogous to HTML used on the world wide web, except that WML is based on the Extensible Markup Language (XML). The gateway 16 then encodes the formatted content into a binary format in order to save valuable bandwidth in the wireless network, such as the WAP binary XML content format.

Referring again to FIG. 2, in step 104 the present invention inquires whether the requester has previously registered for service. If not, in step 106 the application module 21 queries for new account information including, but not limited to, a valid credit card number, a recharge threshold, and a recharge amount. The recharge threshold refers to a minimum account balance below which the present invention requires replenishment. The recharge amount refers to a pre-authorized amount used to replenish an account when the balance has fallen below the recharge threshold.

In step 108, the new prepaid subscriber enters a username and password. The username, for example, may be a phone number where the wireless device 12 is a cellular telephone. In step 110, the username and password are read, again in a conventional manner, and checked against information stored in the customer account database 19. The process of reading and authenticating of a username and password is well known to those skilled in the art. If the username and password combination is invalid, the present invention may permit several failed login attempts before terminating the application.

If application module 21 finds the username and password in the customer account database 19, in step 112 the present invention gives the subscriber an opportunity to perform a variety of popular account management tasks. For an account balance query, in step 114 the application module 21 queries the customer account database 19, using the username received during the login process, to determine the account balance. This step is executed by the application module 21 in a manner well known to those skilled in the art for querying a database for certain records. Finally, in step 116, the present invention displays the account balance on the browser of the wireless device 12 and proceeds to an end in step 117.

If, in step 112, the application module 21 cannot find the subscriber's username the account initialization process begins. In step 118 the application module 21 requests the subscriber to input an amount to prepay. In step 120, the present invention checks the credit associated with the card account to determine whether the prepaid subscriber's account has available credit. The present invention queries credit card transaction server 20 via communication links 30 and 32. Communication between the credit card server 20 and the Internet 22 is protected using, for example, secure sockets layer ("SSL") protocol and user authentication. If in step 122 the subscriber lacks available credit, the present invention may give the subscriber an opportunity to specify a lesser amount in step 118. Once the application module 21 determines that the subscriber has sufficient credit available, the module 21 initializes the prepaid account in step 124 and proceeds to an end in step 117.

If a prepaid subscriber elects, in step 112, to replenish an existing account, then in step 126 the present invention checks the credit associated with the card account to determine whether the prepaid subscriber's account has available credit. In step 128, the present invention determines whether the amount of available credit exceeds the recharge amount. Where the amount of credit available is less than the recharge amount, the present invention allows the prepaid subscriber to enter an amount less than the recharge amount (step 130). Otherwise, the account is replenished in step 132 and proceeds to an end in step 117. According to another embodiment, step 128 would provide an additional check to verify that the account balance, after recharging, exceeds a predetermined minimum amount necessary to complete a voice/data session. The manner of comparing a prepaid account balance with the attributes of a desired communications is well know to those of ordinary skill in the art.

Figure 3:
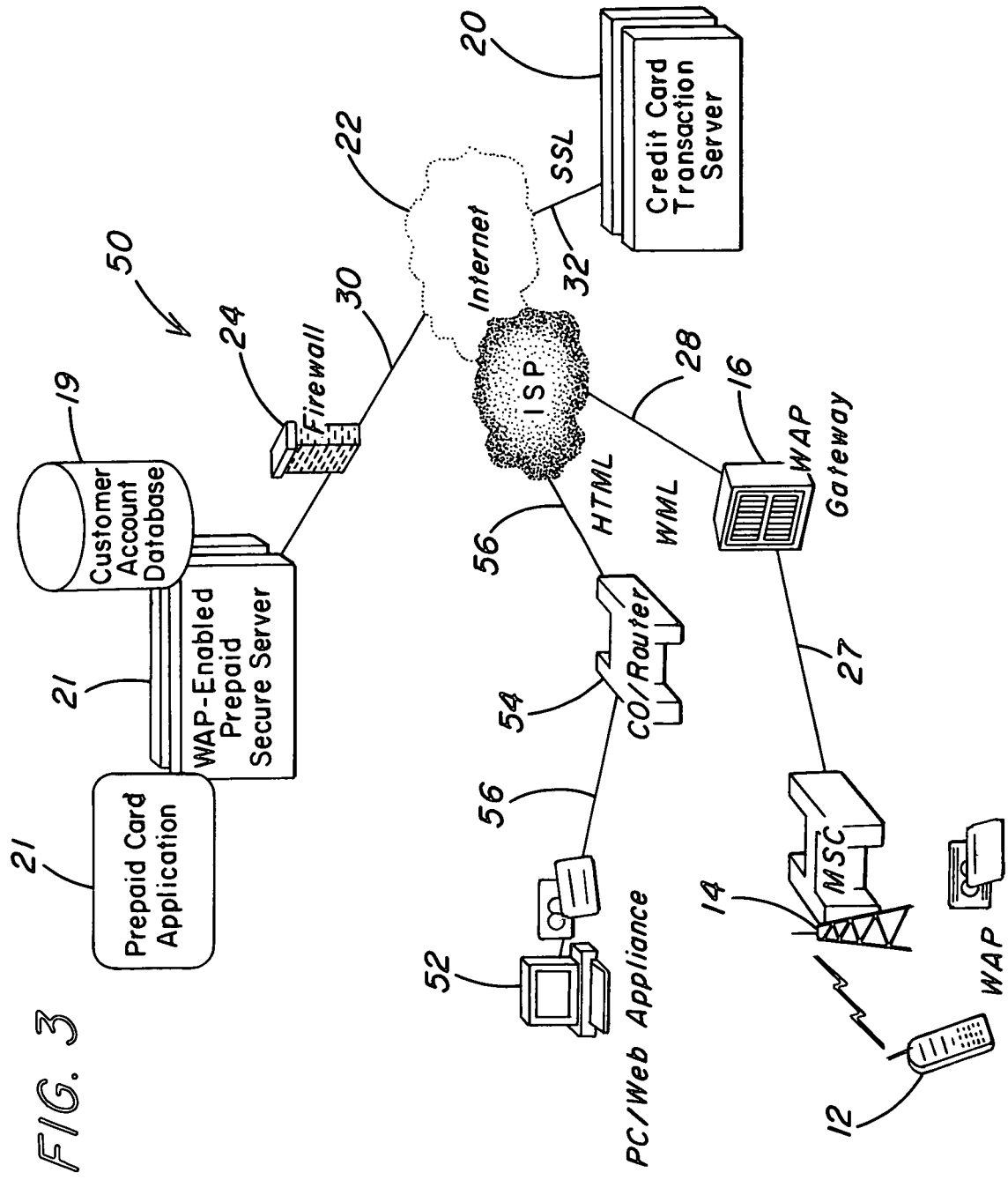
FIG. 3 is a simplified schematic diagram of a system according to another embodiment of the present invention for managing subscriber accounts for prepaid wireless services.

FIG. 3 is a simplified schematic diagram of a system 50 according to another embodiment of the present invention for managing subscriber accounts for prepaid wireless services. The system 50 includes, in addition to those components described above in connection with system 10, a web appliance 52, such as, for example, a personal computer (e.g. a Compaq iPAQ Home Internet Appliance) or a browser on a whiteware appliance, coupled to a router 54 that is operable to route data to and from the Internet 12 via communications link 56. The router 54, in turn, is coupled to the Internet 22 in a conventional manner. The Web appliance 52 gives prepaid subscribers an alternative mechanism for accomplishing the same account management requests described above in connection with the wireless device 12, including account initialization, balance queries, and account recharging. Standard communication protocols, like HTTP and Transmission Control Protocol/Internet Protocol (TCP/IP) manage these requests and the transfer of data along the communications link 56.

Figure 4:
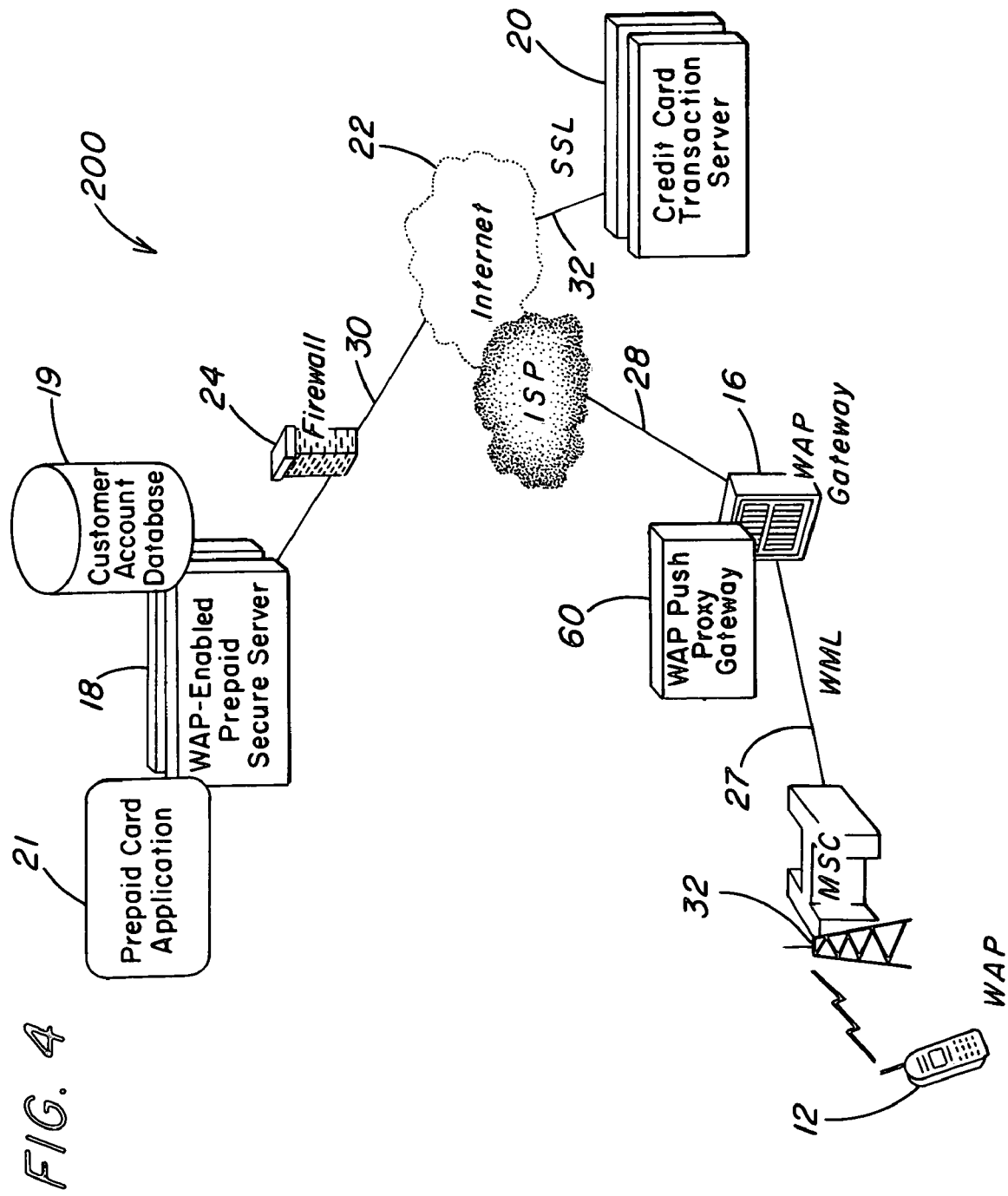
FIG. 4 is a simplified schematic diagram of a system for alerting prepaid subscribers when the recharge threshold is encountered at the conclusion of a voice/data session.

FIG. 4 is a simplified schematic diagram of a system 200 for alerting prepaid subscribers when the recharge threshold is encountered at the conclusion of a voice/data session. Similar to systems 10 and 40, the system 200 includes the wireless device 12, the mobile switching center (MSC) 14, the gateway 16, the prepaid secure server 18, the customer account database 19, and the application module 21. The application module 21 determines the prepaid account balance at the conclusion of the voice/data session and compares the balance to the recharge threshold. If the module 21 finds that the prepaid balance is less than the recharge threshold it issues an alert using, for example, a push framework. WAP push, called push access protocol, is used to convey content and push related control information between the application module 21 (the push initiator) and wireless device 12 (the push proxy) without a previous user action. A push proxy gateway 60, like the gateway 16, parses control information and transforms WML content into binary form.

FIG. 5 is an exemplary flow diagram that illustrates a process 300 for alerting prepaid subscribers when the recharge threshold is encountered at the conclusion of a voice/data session. Assume, for example, that a prepaid user with an account balance of $12 and a recharge threshold of $10 makes a call on the wireless device 12. FIG. 5 is entered at step 302 just as a voice/data session terminates. In step 304, the wireless device 12 reports the minutes of use to the application module 21. The module 21 then updates the account balance in the customer account database 19. In step 306, the present invention determines whether the most recent voice/data session caused the account balance to fall below the recharge threshold. In this example, when the account balance falls below $10, the recharge threshold, the application module 21 issues a WAP push notification, addressed to the username provided during registration, that proceeds through a push proxy gateway 60 and finally to the WAP-capable wireless device 12 (steps 308 and 310). In one embodiment, when the account falls below a threshold, a short messaging service (SMS) message having an alert is sent to the address of the wireless device 12. Accordingly, the wireless device 12 displays a notification that the account balance has fallen below $10. The prepaid architecture could, according to one embodiment, allow subscribers to draw the account balance below zero provided the initial account registration provided for overdraft. According to another embodiment, the subscriber could specify a minimum account balance, such as $50, that would trigger a push alert.

According to another embodiment, the module 21 may issue an alert anytime the wireless device 12 is powered on, rather than just at the termination of a call. Furthermore, prepaid subscribers could specify the frequency of recharge alerts that occur once the recharge threshold has been encountered. Subscribers could specify the frequency, for example, during account initialization. According to another embodiment, the module 21 could be configured so that subscribers could specify the notification frequency based on elapsed time or a certain triggering event.

According to another embodiment, the module 21 could be configured to deliver an in-call notification if the mobile switching center and wireless device are capable of simultaneous voice/data sessions. For example, the wireless device 12 could emit an audible signal during a call, notifying the subscriber that the account balance has fallen below the recharge threshold. If the wireless device 12 is a cellular phone, the subscriber could recharge the account balance without dropping the call.

It should be understood that the invention is not limited by the foregoing description of preferred embodiments, but embraces all such alterations, modifications, and variations in accordance with the spirit and scope of the appended claims.

What is claimed is:

1. A communications system, having a prepaid architecture for managing a plurality of prepaid wireless accounts for communication services, wherein each prepaid account is associated with a prepaid subscriber, comprising:
   a wireless network including a mobile switch, in communication with a wireless device, the wireless device for remotely managing at least one of the prepaid accounts;
   a wide area network including:
      a prepaid account database for storing records assigned to subscribers of prepaid communications service;
      a prepaid application module for initializing and updating the prepaid accounts, for determining a current account balance while the prepaid communications service is in use by a subscriber, for comparing the current account balance to a recharge threshold, and for generating alerts once the current account balance falls below the recharge threshold while the prepaid communications service is in use and wherein the prepaid application module decreases an amount of time from one alert to a subsequent alert as the current account balance continues to fall during use of the prepaid communications service;
      a credit card transaction server, coupled to a credit card database, for checking available credit;
      a prepaid server coupled to the prepaid account database and the prepaid application module; and
   a gateway in communication with the mobile switch of the wireless network and in communication with the wide area network to deliver the alerts to the wireless devices, wherein the gateway is selected from the group consisting of a push proxy and a WAP push proxy.

2. The system of claim 1, further comprising:
   a web appliance, in communication with the wide area network, for remotely managing at least one of the prepaid accounts.

3. The system of claim 2 wherein the wireless device is WAP-enabled and wherein the mobile switch is WAP-enabled and wherein the gateway is WAP-enabled.

4. The system of claim 3, wherein the wireless device is selected from the group consisting of a cellular telephone, a personal digital assistant and a pager.

5. A method for replenishing a prepaid wireless account, wherein the prepaid account is associated with a prepaid subscriber, and wherein the account includes credit card account information associated with a subscriber requesting replenishment, the method comprising:
   providing wireless access to a network for managing the prepaid account;
   coupling a wireless device to the network;
   receiving credit card account information through the network by the subscriber entering the credit card account information into the wireless device;
   charging a pre-authorized amount to the credit card account identified by the credit card account information;
   determining a current account balance while a prepaid communications service of the prepaid account is in use a subscriber;
   comparing the current account balance to a recharge threshold;
   pushing alerts to the wireless device via a gateway in communication with the network once the current account balance falls below the recharge threshold while the prepaid communications service is in use, wherein the gateway is selected from the group consisting of a push proxy and a WAP push proxy; and
   wherein the prepaid application module decreases an amount of time from one alert to a subsequent alert as the current account balance continues to fall during use of the prepaid communications service.

6. The method of claim 5, further comprising:
   coupling a web appliance to the network for managing the prepaid account.

7. The method of claim 5, wherein the wireless device is WAP-enabled.

8. A method for retrieving an account balance for a prepaid wireless account, wherein the prepaid account is associated with a prepaid subscriber, an wherein the account balance is stored in a customer account database, the method comprising:
   providing wireless access to a network for managing the prepaid account;
   coupling a wireless device to the network;
   during a communications session, querying the customer account database to obtain the account balance;
   pushing alerts to the wireless device via a gateway in communication with the network during the communication session once the subscriber account balance falls below a recharge threshold amount, wherein the gateway is selected from the group consisting of a push proxy and a WAP push proxy, and wherein an amount of time from one alert to a subsequent alert is decreased as the current account balance continues to fall during the communications session.

9. The method of claim 8, further comprising:
   coupling a web appliance to the network for managing the prepaid account.

10. The method of claim 9, wherein the wireless device is WAP-enabled.

11. A system for replenishing a prepaid wireless account, wherein the prepaid account is associated with a prepaid subscriber, and wherein the account includes credit card account information associated with a subscriber requesting replenishment, the system comprising:
   means for providing wireless access to a network for managing the prepaid account;
   means for coupling a wireless device to the network;
   means for charging a pre-authorized amount to the credit card account; and
   means for pushing an alert to the wireless device via a gateway in communication with the network when a subscriber account balance falls below a recharge threshold amount during a communication session, wherein the gateway is selected from the group consisting of a push proxy and a WAP push proxy and wherein an amount of time from one alert to a subsequent alert is decreased as the current account balance continues to fall during the communications session.

12. The system of claim 11, further comprising:
means for coupling a web appliance to the network for managing the prepaid account.

13. The system of claim 12, wherein the wireless device is WAP-enabled.

14. A system for retrieving an account balance for a prepaid wireless account, wherein the prepaid account is associated with a prepaid subscriber, and wherein the account balance is stored in a customer account database, the steps comprising:
means for providing wireless access to a network for managing the prepaid account;
means for coupling a wireless device to the network;
means for automatically querying the customer account database to retrieve the account balance during a communications session; and
means for pushing an alert to the wireless device via a gateway in communication with the network when a subscriber account balance falls below a recharge threshold amount during the communications session, wherein the gateway is selected from the group consisting of a push proxy and a WAP push proxy and wherein an amount of time from one alert to a subsequent alert is decreased as the current account balance continues to fall during the communications session.

15. The system of claim 14, further comprising:
means for providing a web appliance for accessing the network; and means for coupling a web appliance to the network for managing the prepaid account.

16. The system of claim 15, wherein the wireless device is WAP-enabled.

17. A computer-readable medium having stored thereon instructions which, when executed by a processor, cause the processor to perform the steps of:
collecting credit card account information from a prepaid subscriber, wherein the prepaid account is associated with a prepaid subscriber;
establishing the prepaid account on a subscriber account database;
receiving a prepaid amount from the prepaid subscriber;
checking the credit card account for available credit based on the prepaid amount; and
pushing an alert to the wireless device via a gateway when a subscriber account balance falls below a recharge threshold amount during a communications session, wherein the gateway is selected from the group consisting of a push proxy and a WAP push proxy and wherein an amount of time from one alert to a subsequent alert is decreased as the current account balance continues to fall during the communications session.

* * * * *